United States Patent
Knoche et al.

(10) Patent No.: US 10,364,839 B2
(45) Date of Patent: Jul. 30, 2019

(54) BEARING ASSEMBLY

(71) Applicant: Aktiebolaget SKF, Gothenburg (SE)

(72) Inventors: Christian Knoche, Schweinfurt (DE); Thilo Beck, Wipfeld (DE); Andreas Klopf, Rannungen (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/830,353

(22) Filed: Dec. 4, 2017

(65) Prior Publication Data

US 2018/0156270 A1    Jun. 7, 2018

(30) Foreign Application Priority Data

Dec. 7, 2016   (DE) .......................  10 2016 224 395

(51) Int. Cl.

| | |
|---|---|
| *F16C 19/52* | (2006.01) |
| *F16C 33/36* | (2006.01) |
| *F16C 19/38* | (2006.01) |
| *F16C 33/46* | (2006.01) |
| *F16C 19/36* | (2006.01) |
| *F16C 25/08* | (2006.01) |

(Continued)

(52) U.S. Cl.
CPC .......... *F16C 19/385* (2013.01); *F16C 19/364* (2013.01); *F16C 25/08* (2013.01); *F16C 33/4635* (2013.01); *F16C 33/4676* (2013.01); *F16C 33/586* (2013.01); *F16C 19/547* (2013.01); *F16C 2202/22* (2013.01); *F16C 2208/10* (2013.01); *F16C 2240/30* (2013.01); *F16C 2240/34* (2013.01); *F16C 2361/61* (2013.01)

(58) Field of Classification Search
CPC .... F16C 19/386; F16C 19/525; F16C 19/548; F16C 25/083; F16C 35/077; F16C 2202/22; F16C 2229/00
See application file for complete search history.

(56) References Cited

U.S. PATENT DOCUMENTS

| | | | | |
|---|---|---|---|---|
| 5,028,152 A | * | 7/1991 | Hill ....................... | F16C 19/364 384/557 |
| 9,222,508 B2 | * | 12/2015 | Brown ................... | F16C 19/364 |
| 9,476,455 B2 | * | 10/2016 | Spies ..................... | F16C 33/586 |

(Continued)

FOREIGN PATENT DOCUMENTS

JP        06280865 A  *  10/1994  ............ F16C 19/364

*Primary Examiner* — Phillip A Johnson
(74) *Attorney, Agent, or Firm* — Bryan Peckjian; SKF USA Inc. Patent Dept.

(57) ABSTRACT

A bearing assembly is configured to rotatably support a first machine part in a second machine part and includes first and second rolling-element bearings. The rolling-element bearings are installed in the bearing assembly with an axial preload or an axial clearance. The second machine part includes a first conical abutment surface, and the first rolling-element bearing includes a bearing ring having a second conical abutment surface facing the first conical abutment surface of the second machine part. An intermediate ring is disposed between and abuts the first and second conical abutment surfaces. The bearing ring and the second machine part are metal, and the intermediate ring is formed from a material that has a higher coefficient of thermal expansion than that of the bearing ring and second machine part.

14 Claims, 1 Drawing Sheet

(51) Int. Cl.
*F16C 33/58* (2006.01)
*F16C 19/54* (2006.01)

(56) References Cited

U.S. PATENT DOCUMENTS

| | | | | |
|---|---|---|---|---|
| 2015/0308504 A1* | 10/2015 | Katsaros | ................ | F16C 25/08 384/125 |
| 2016/0195134 A1* | 7/2016 | Spies | ................ | F16C 23/08 384/557 |
| 2016/0236510 A1* | 8/2016 | Beck | ................ | B60B 27/0078 |

* cited by examiner

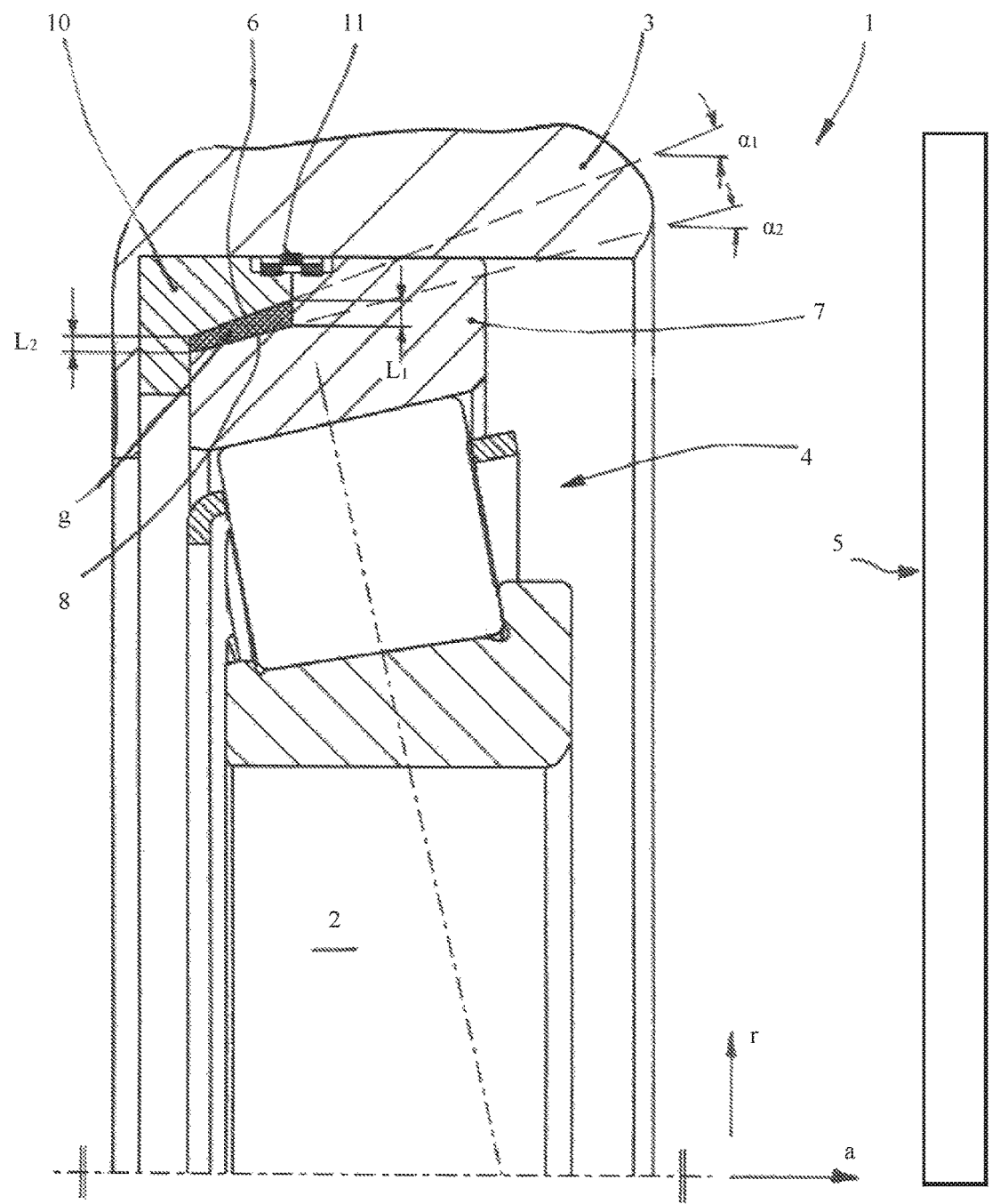

BEARING ASSEMBLY

CROSS-REFERENCE

This application claims priority to German patent application no. 10 2016 224 395.0 filed on Dec. 7, 2016, the contents of which are fully incorporated herein by reference.

TECHNOLOGICAL FIELD

The disclosure is directed to a bearing assembly for supporting a first machine part in a second machine part and includes a first rolling-element bearing and a second rolling-element bearing. The two rolling-element bearings are adjusted axially against each other, and in particular are installed in the bearing assembly under axial preload or axial clearance.

BACKGROUND

Preloaded bearing assemblies of the type mentioned are well known in the prior art and common. Often two tapered roller bearings (but, for example, also angular contact ball bearings, axial roller bearings, axial cylindrical roller bearings, axial ball bearings) are tensioned against each other axially in order to achieve a clearance-free supporting, for example, of a shaft in a housing.

Here the problem arises that with changes of the temperature of the machine assembly a corresponding thermal influence is also given on the bearing assembly, whereby the preload in the bearing assembly or the clearance in the same is disadvantageously changed.

An aspect of the disclosure is to further improve a bearing assembly of the above-mentioned type such that it is ensured that even with temperature changes the desired axial preload or a defined axial bearing clearance is maintained in the rolling-element bearings.

The solution of this object by the disclosure is characterized in that the second machine part includes a first conical abutment surface and that at least one of the rolling-element bearings includes a bearing ring that includes a second conical abutment surface, wherein an intermediate ring is disposed between the first conical abutment surface and the second conical abutment surface, which intermediate ring abuts on both conical abutment surfaces, wherein the bearing ring provided with the conical abutment surface as well as the second machine part is comprised of a metallic material at least in the region of its receiving of the bearing ring, and wherein the intermediate ring is comprised of a material that has a higher thermal expansion coefficient compared to the metallic material of the second machine part and of the bearing ring.

Here the intermediate ring is preferably comprised of a plastic, preferably of fluorinated rubber (available under the trade name "Viton").

The two rolling-element bearings are preferably tapered roller bearings.

The cone angle of the first conical abutment surface preferably falls between 15° and 55°, particularly preferably between 15° and 30°. However, the cone angle of the second conical abutment surface preferably falls between 10° and 50°, particularly preferably between 10° and 25°.

The cone angle of the first conical abutment surface and the cone angle of the second conical abutment surface here can be the same size. However, it is also possible that the cone angle of the first conical abutment surface is greater than the cone angle of the second conical abutment surface.

The first and the second conical abutment surface here are in particular disposed in the same direction with respect to the axial direction.

According to one preferred exemplary embodiment of the disclosure the first conical abutment surface in the second machine part is formed by an abutment ring, which is disposed in the second machine part, wherein the abutment ring is comprised of a metallic material. For the purpose of reducing wear it is preferably provided in this case that means are available by which a rotation of the abutment ring about the axis of the bearing assembly relative to the bearing ring is prevented.

Using the proposed design of a bearing assembly it is achieved that even with a change of the temperature the adjustment or the clearance in two interacting rolling-element bearings can be held constant. This applies in particular with the use of two tapered roller bearings preloaded against each other.

Furthermore it is achieved by the above mentioned measures that wear of the components and in particular a "creeping" (i.e., a migrating of components relative to others) can be prevented or minimized This is achieved by the use of materials that have a different thermal expansion. In the present case an intermediate ring made of plastic (in particular made of "Viton") having a relatively large thermal expansion is preferably used, which is used with the components made of metal having a relatively small thermal expansion. The desired effect arises in interaction with the mentioned conical surfaces on which the intermediate ring abuts. The conical surfaces act as sliding surfaces, on which a sliding movement can take place if different thermally induced expansions arise. A precise axial movement of the intermediate ring relative to the outer ring of the one rolling-element bearing can thereby be generated, which serves for compensation of movements that take place with a thermal change.

The bearing rings and optionally also the housing as well as the abutment ring are usually comprised of steel or another metallic material having a similar thermal expansion coefficient. For orientation, it is mentioned that the thermal expansion coefficient here falls in the range of approximately 0.000011 to 0.000012 1/K (values of steel).

However, in plastics the thermal expansion coefficient falls significantly higher than in metals and usually falls above 0.000050 1/K.

An improvement of the adjustment of the two interacting rolling-element bearings thus advantageously arises via an axial clearance reduction.

The risk of "creeping" of the intermediate ring and thus the risk of increased wear is reduced or entirely prevented by an anti-creep ring, which is discussed above as means for preventing a rotation.

The cone angle of the two above-mentioned conical surfaces can be the same size or also chosen differently so that the radial thickness of the intermediate ring changes over the axial position of the same. With identical cone angles a constant radial thickness of the intermediate ring results. The choice of the respective cone angle results from the given or to-be-expected thermal conditions in the machine assembly.

The conical surfaces of the bearing ring or of the housing or of the abutment ring can be provided with a friction-reducing coating, wherein the friction-reducing coating is or includes in particular polytetrafluoroethylene (PTFE) or a sliding coating. The conical surfaces can also alternatively or additionally be provided with a lubricant.

The operation of the rolling-element bearing thus always takes place in the optimum preload range or bearing clearance range in order to achieve optimum operating conditions of the bearing (for example, a uniformly controllable heat development or a uniformly controllable rolling-element bearing load).

In the present case conical surfaces are discussed, which are formed in the bearing ring or in the housing or in the abutment ring. Of course it is also contained in the scope of the present disclosure when the surfaces in question are configured slightly crowned and then interact in the manner of two congruent spherical caps.

The disclosed solution can be used, for example, both in industrial transmissions and in automobile transmissions for automobiles and trucks (here also in differential transmissions). Tool spindle bearing assemblies are furthermore a preferred application.

An improved load distribution in an adjusted bearing assembly thus arises in an advantageous manner The present disclosure thus provides a compensating element that ensures that the bearing preload remains unchanged in the event of thermal changes.

BRIEF DESCRIPTION OF THE DRAWING

An exemplary embodiment of the disclosure is depicted in the drawing. The single FIGURE shows a radial section through a part of a bearing assembly, wherein a shaft is supported in a housing by two axially preloaded tapered roller bearings.

DETAILED DESCRIPTION

In the FIGURE a bearing assembly 1 is depicted, using which a first machine part 2 in the form of a shaft is supported in a second machine part 3 in the form of a housing. The support is effected using a first rolling-element bearing 4 and a second rolling-element bearing 5 (depicted schematically) that are spaced from each other in the direction of the axis a of the bearing assembly 1. In this case the two rolling-element bearings 4 and 5 are tapered roller bearings (here in face-to-face arrangement). The two rolling-element bearings 4, 5 are preloaded axially, i.e., in the direction of the axis a.

The bearing outer ring 7 of the rolling-element bearing 4 is not directly axially disposed in the housing 3; rather it is fixed axially thereon via an abutment ring 10 in the housing.

As can be seen, the housing 3, or in the present case the abutment ring 10 abutting thereon, includes a first conical abutment surface 6. This has a cone angle $\alpha_1$.

However, the bearing ring 7 includes a second conical abutment surface 8 that has a cone angle $\alpha_2$.

An intermediate ring 9 is disposed between the first conical abutment surface 6 and the second conical abutment surface 8. This abuts on both conical abutment surfaces 6 and 8, i.e., it includes corresponding congruent seat surfaces in order to abut on said conical abutment surfaces.

The bearing ring 7, which includes the conical abutment surface 8, is comprised of rolling-element bearing steel; the housing 3 as well as the abutment ring 10 are comprised of steel or cast steel (the housing 3 can also be comprised of light metal). Accordingly both the bearing ring and the housing or the abutment ring have a low thermal expansion coefficient that lies at a first, low level.

However, the intermediate ring 9 is comprised of a material that lies at a second, higher level compared to the material of the bearing ring and of the housing or of the abutment ring. In this case the material of the intermediate ring 9 is plastic, and specifically fluorinated rubber. Its thermal expansion coefficient falls in the range of 3- to 6-times that of the metal of the bearing ring or housing/abutment ring.

The intermediate ring 9 can have a constant thickness in radial direction r, however, it can also be so embodied as the FIGURE shows. Hereinafter the intermediate ring 9 has a radial spacing $L_1$ in its left axial end region, while it has a larger radial spacing $L_2$ in its right axial end region.

In order to prevent wear due to relative movements, and namely relative rotation about the axis a, means 11 for preventing a rotation are provided that ensure that a relative rotation between the bearing ring 7 and the abutment ring 10 is prevented. These means are an anti-creeping ring that acts between the two components 7 and 10. This ring can develop a clamping force that clamps the components 7 and 10 to each other such that they rotate together and also to the housing 3 such that it rotates together with the components 7 and 10.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 First machine part (shaft)
3 Second machine part (housing)
4 First rolling-element bearing (tapered roller bearing)
5 Second rolling-element bearing (tapered roller bearing)
6 First conical abutment surface
7 Bearing ring
8 Second conical abutment surface
9 Intermediate ring
10 Abutment ring
11 Means for preventing a rotation
$\alpha_1$ Cone angle
$\alpha_2$ Cone angle L1 Radial spacing
L2 Radial spacing
a Axis of the bearing assembly
r Radial direction of the bearing assembly

What is claimed is:

1. A bearing assembly configured to rotatably support a first machine part in a second machine part, the bearing assembly comprising:
    a first rolling-element bearing; and
    a second rolling-element bearing,
    wherein the first rolling-element bearing and the second rolling-element bearing are installed in the bearing assembly with an axial preload or an axial clearance,
    wherein the second machine part includes a first conical abutment surface and the first rolling-element bearing includes a bearing ring having a second conical abutment surface facing the first conical abutment surface of the second machine part,
    wherein an intermediate ring is disposed between the first conical abutment surface and the second conical abutment surface in abutment with the first and second conical abutment surfaces,
    wherein the bearing ring comprises a first metal and the second machine part comprises a second metal,
    wherein the intermediate ring comprises a material having a higher coefficient of thermal expansion than a coefficient of thermal expansion of the first metal and higher than a coefficient of thermal expansion of the second metal, and
    wherein a cone angle ($\alpha_1$) of the first conical abutment surface is greater than a cone angle ($\alpha_2$) of the second conical abutment surface.

2. The bearing assembly according to claim 1, wherein the intermediate ring comprises a plastic.

3. The bearing assembly according to claim 1, wherein the intermediate ring comprises a fluorinated rubber.

4. The bearing assembly according to claim 1 wherein the first and second rolling-element bearings are tapered rolling-element bearings.

5. The bearing assembly according to claim 1, wherein a cone angle ($\alpha_1$) of the first conical abutment surface is from 15° to 55°.

6. The bearing assembly according to claim 5, wherein a cone angle ($\alpha_2$) of the second conical abutment surface is from 10° to 50°.

7. The bearing assembly according to claim 5, wherein a cone angle ($\alpha_1$) of the first conical abutment surface is equal to a cone angle ($\alpha_2$) of the second conical abutment surface.

8. The bearing assembly according to claim 1, wherein a cone angle ($\alpha_1$) of the first conical abutment surface is from 15° to 30°.

9. The bearing assembly according to claim 8, wherein a cone angle ($\alpha_2$) of the second conical abutment surface is from 10° to 25°.

10. The bearing assembly according to claim 1, wherein the first and the second conical abutment surface face in a same direction with respect to an axial direction.

11. A bearing assembly configured to rotatably support a first machine part in a second machine part, the bearing assembly comprising:
    a first rolling-element bearing; and
    a second rolling-element bearing,
    wherein the first rolling-element bearing and the second rolling-element bearing are installed in the bearing assembly with an axial preload or an axial clearance,
    wherein the second machine part includes a first conical abutment surface and the first rolling-element bearing includes a bearing ring having a second conical abutment surface facing the first conical abutment surface of the second machine part,
    wherein an intermediate ring is disposed between the first conical abutment surface and the second conical abutment surface in abutment with the first and second conical abutment surfaces,
    wherein the bearing ring comprises a first metal and the second machine part comprises a second metal,
    wherein the intermediate ring comprises a material having a higher coefficient of thermal expansion than a coefficient of thermal expansion of the first metal and higher than a coefficient of thermal expansion of the second metal,
    wherein the first conical abutment surface is formed on an abutment ring mounted to the second machine part, and wherein the abutment ring comprises metal, and
    wherein the bearing assembly further comprises a means for preventing rotation of the abutment ring relative to the bearing ring.

12. The bearing assembly according to claim 11, wherein the intermediate ring is configured to maintain the axial preload or to maintain the axial clearance over a range of operating temperatures.

13. The assembly according to claim 11, wherein the first machine part is a shaft and the second machine part is a housing.

14. A bearing assembly configured to rotatably support a first machine part in a second machine part, the bearing assembly comprising:
    a first rolling-element bearing; and
    a second rolling-element bearing,
    wherein the first rolling-element bearing and the second rolling-element bearing are installed in the bearing assembly with an axial preload or an axial clearance,
    wherein the second machine part includes a first conical abutment surface and the first rolling-element bearing includes a bearing ring having a second conical abutment surface facing the first conical abutment surface of the second machine part,
    wherein an intermediate ring is disposed between the first conical abutment surface and the second conical abutment surface in abutment with the first and second conical abutment surfaces,
    wherein the bearing ring comprises a first metal and the second machine part comprises a second metal,
    wherein the intermediate ring comprises a material having a higher coefficient of thermal expansion than a coefficient of thermal expansion of the first metal and higher than a coefficient of thermal expansion of the second metal,
    wherein the intermediate ring comprises a fluorinated rubber,
    wherein the first and second rolling-element bearings are tapered rolling-element bearings,
    wherein a cone angle ($\alpha_1$) of the first conical abutment surface is from 15° to 30°,
    wherein a cone angle ($\alpha_2$) of the second conical abutment surface is from 10° to 25°, and
    wherein the first rolling-element bearing and the second rolling-element bearing are installed in the bearing assembly with an axial preload.

* * * * *